(12) United States Patent
Kato et al.

(10) Patent No.: US 9,845,438 B2
(45) Date of Patent: Dec. 19, 2017

(54) GAS PURIFICATION APPARATUS AND GAS PURIFICATION METHOD

(71) Applicant: MITSUBISHI HEAVY INDUSTRIES, LTD., Tokyo (JP)

(72) Inventors: Yudai Kato, Tokyo (JP); Kentaro Nakamura, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 162 days.

(21) Appl. No.: 14/771,053

(22) PCT Filed: Feb. 26, 2014

(86) PCT No.: PCT/JP2014/054649
§ 371 (c)(1),
(2) Date: Aug. 27, 2015

(87) PCT Pub. No.: WO2014/136632
PCT Pub. Date: Sep. 12, 2014

(65) Prior Publication Data
US 2016/0032201 A1 Feb. 4, 2016

(30) Foreign Application Priority Data
Mar. 5, 2013 (JP) .................................. 2013-042795

(51) Int. Cl.
*B01D 53/48* (2006.01)
*B01D 53/86* (2006.01)
(Continued)

(52) U.S. Cl.
CPC ................ *C10K 1/34* (2013.01); *B01D 53/48* (2013.01); *B01D 53/8606* (2013.01); *C10J 3/02* (2013.01);
(Continued)

(58) Field of Classification Search
None
See application file for complete search history.

(56) References Cited

U.S. PATENT DOCUMENTS 4,704,137 A * 11/1987 Richter ...................... C10J 3/06
252/373
4,735,788 A  4/1988 Voirin
(Continued)

FOREIGN PATENT DOCUMENTS

CN  1083851 A  3/1994
CN  101553303 A  10/2009
(Continued)

OTHER PUBLICATIONS

Office Action dated Dec. 9, 2016, issued in counterpart Chinese Patent Application No. 201480011539.5, with English translation. (12 pages).
(Continued)

*Primary Examiner* — Wayne Langel
(74) *Attorney, Agent, or Firm* — Westerman, Hattori, Daniels & Adrian, LLP (57) ABSTRACT

The present invention is intended to provide a gas purification apparatus and a gas purification method with an excellent thermal efficiency and capable of degrading COS at a high degradation rate. A gas purification apparatus configured to purify gas at least including COS, $H_2O$, $CO_2$, and $H_2S$ includes a COS treatment device which is provided with a COS conversion catalyst and configured to treat and degrade COS in the gas by hydrolysis, and $H_2O$ adjustment means configured to adjust the concentration of $H_2O$ in the gas to be introduced into the COS treatment device.

8 Claims, 4 Drawing Sheets

(51) Int. Cl.
*C10K 1/34* (2006.01)
*C10K 1/00* (2006.01)
*C10J 3/02* (2006.01)
*C10J 3/20* (2006.01)
*C10J 3/82* (2006.01)
*C10K 1/10* (2006.01)
*C10J 3/72* (2006.01)

(52) U.S. Cl.
CPC .............. *C10J 3/20* (2013.01); *C10J 3/723* (2013.01); *C10J 3/82* (2013.01); *C10K 1/002* (2013.01); *C10K 1/004* (2013.01); *C10K 1/101* (2013.01); *C10J 2300/093* (2013.01); *C10J 2300/0909* (2013.01)

(56) References Cited

U.S. PATENT DOCUMENTS

| | | | | |
|---|---|---|---|---|
| 4,857,077 | A | | 8/1989 | Potter |
| 5,695,532 | A | * | 12/1997 | Johnson .................... C10J 3/463 48/203 |
| 6,322,763 | B1 | * | 11/2001 | McDaniel .......... B01D 53/1456 423/242.1 |
| 6,648,931 | B1 | * | 11/2003 | Rao ........................... C01B 3/36 422/198 |
| 8,691,167 | B2 | * | 4/2014 | Flynn ................. B01D 53/8606 423/242.1 |
| 8,951,314 | B2 | * | 2/2015 | Leininger ................ C10J 3/506 48/62 R |
| 2010/0065782 | A1 | | 3/2010 | Dierickx et al. |

FOREIGN PATENT DOCUMENTS

| | | | |
|---|---|---|---|
| JP | 57-147592 | A | 9/1982 |
| JP | 62-500999 | A | 4/1987 |
| JP | 63-191894 | A | 8/1988 |
| JP | 10-316978 | A | 12/1998 |
| JP | 11-241076 | A | 9/1999 |
| JP | 2003-522020 | A | 7/2003 |
| JP | 2005-226028 | A | 8/2005 |
| JP | 3688922 | B2 | 8/2005 |
| JP | 2010-511765 | A | 4/2010 |
| JP | 4467872 | B2 | 5/2010 |
| JP | 4594886 | B2 | 12/2010 |
| JP | 2011-168628 | A | 9/2011 |
| WO | 93/23500 | A1 | 11/1993 |
| WO | 1993/023500 | A1 | 11/1993 |
| WO | 01/57161 | A1 | 8/2001 |
| WO | 2008/068305 | A2 | 6/2008 |

OTHER PUBLICATIONS

Office Action dated Aug. 19, 2016, issued in counterpart Japanese Patent Application No. 2013-042795, with English translation. (6 pages).
Office Action dated Oct. 18, 2016, issued in counterpart Japanese Application No. 2013-042795, with English translation (4 pages).
International Search Report dated May 20, 2014, issued in counterpart Application No. PCT/JP2014/054649 (2 pages).
Notification of Transmittal of Translation of the International Preliminary Report on Patentability (Forms PCT/IB/338) issued in counterpart International Application No. PCT/JP2014/054649 dated Sep. 17, 2015 with Forms PCT/IB/373 and PCT/IB/237 (7 pages).
Office Action dated Jul. 26, 2016, issued in counterpart Chinese Patent Application No. 201480011539.5, with English translation. (15 pages).
Notice of Allowance dated May 26, 2016, issued in counterpart Australian Patent Application No. 2014227165. (4 pages).
Office Action dated Jul. 26, 2016, issued in counterpart Chinese Patent Application No. 201480011539.5, with English translation. (15 pags).

* cited by examiner

GAS PURIFICATION APPARATUS AND GAS PURIFICATION METHOD

BACKGROUND OF THE INVENTION

Technical Field

The present invention relates to a gas purification apparatus and a gas purification method capable of promoting a treatment for degrading COS by adjusting the concentration of $H_2O$ in material gas.

Background Art

As one of the ultimate solutions to energy issues arising in recent years, effective utilization of coal has attracted much attention. To convert coal into an energy medium with a high additional value such as methanol and ammonia, advanced techniques are used such as a technique for gasifying coal and a technique for purifying gas obtained by gasifying coal.

Sulfur is commonly contained in coal, and when coal is gasified, the gas includes sulfur compounds such as carbon oxysulfide (COS) and hydrogen sulfide ($H_2S$). If this gasified gas is burned without removing such sulfur compounds, the burned compounds will be discharged into the atmosphere as sulfur oxides, which can cause acid rain and environmental damage. Although wet gas purification processes in which $H_2S$ is removed by using amine-based aqueous solutions have been commercialized as methods for removing such sulfur compounds, COS cannot be removed by using amine-based aqueous solutions.

To solve this problem, a catalytic reaction process has been proposed in which COS is degraded by a hydrolytic reaction process expressed by the following expression (2) and converted into $H_2S$, which can be removed by using an amine-based aqueous solution (e.g., Patent Literature 1).

[Expression 1]

$$COS + H_2O \rightarrow H_2S + CO_2 \quad (2)$$

Because COS degradation reactions are hydrolytic, if the concentration of $H_2O$ in material gas is high, COS can be degraded at a higher degradation rate. In the gas purification apparatus discussed in Patent Literature 2, for example, gasified gas discharged from a gasification furnace is introduced into a COS converter via a water washing column to degrade COS and is then fed into an absorption column to remove $H_2S$ therefrom. In the water washing column, impurities in the gasified gas are recovered and the concentration of $H_2O$ in the gasified gas increases, and therefore, COS is easily degraded in the COS converter. However, it is necessary to cool the gasified gas heated in the gasification furnace for water washing in the water washing column and then heat the cooled gasified gas again up to a temperature suitable for degradation of COS. As described above, because processes for heating and cooling gasified gas are repeated in a gas purification apparatus, the facility configuration may be complex, and also, the thermal efficiency of the configuration of the processes may be low.

On the other hand, the gas purification apparatus described in Patent Literature 3, for example, has an apparatus configuration in which gasified gas discharged from a gasification furnace is introduced into a COS treatment device for degradation of COS and is then fed into a water washing column. The gasified gas having been heated in the gasification furnace is cooled by a heat exchanger to a temperature suitable for degradation of COS, and after COS has been degraded, the gas is further cooled to a temperature suitable for washing with water. As described above, the gas purification apparatus does not repeat heating and cooling of gasified gas, which realizes a process configuration with an excellent thermal efficiency. However, because the gasified gas discharged from the gasification furnace is introduced into the COS treatment device without adjusting the concentration of $H_2O$, the concentration of $H_2O$ in the gasified gas depends on gasification conditions for the gasification furnace. Therefore, it is difficult to always degrade COS at a high degradation rate.

CITATION LIST

Patent Literature

Patent Literature 1: JP 4594886 B1
Patent Literature 2: JP 3688922 B1
Patent Literature 3: JP 4467872 B1

SUMMARY OF INVENTION

Technical Problem

In order to solve the above-described problems, the purpose of the present invention is to provide a gas purification apparatus and a gas purification method with an excellent thermal efficiency capable of degrading COS at a high degradation rate.

Solution to Problem

In order to solve the above-described problems, the inventor has conducted various research to improve the COS degradation rate without decreasing the thermal efficiency. The inventor has thus found that COS can be degraded at a high degradation rate without decreasing the thermal efficiency by adjusting the concentration of $H_2O$ before hydrolytic degradation of COS, and the present invention has been completed on the basis of this finding.

In other words, in a first embodiment according to the present invention, a gas purification apparatus is configured to purify gas that at least includes COS, $H_2O$, $CO_2$ and $H_2S$, the gas purification apparatus at least being provided with a COS treatment device including a COS conversion catalyst and being configured to degrade COS in the gas by hydrolysis, and $H_2O$ adjustment means configured to adjust the concentration of $H_2O$ in the gas to be introduced to the COS treatment device.

In a second embodiment of the present invention, a gas purification method for purifying gas which at least includes COS, $H_2O$, $CO_2$, and $H_2S$, the gas purification method includes an $H_2O$ adjustment step of adjusting the concentration of $H_2O$ in the gas, and a COS treatment step of degrading COS in the gas, the gas of which the concentration of $H_2O$ has been adjusted, by hydrolysis by using a COS conversion catalyst.

Advantageous Effects of Invention

According to the present invention, COS can be degraded at a high degradation rate without decreasing thermal efficiency.

DESCRIPTION OF EMBODIMENTS

General embodiments of the present invention will be described in detail below.

To begin with, a gas purification apparatus of the present invention is an apparatus configured to purify gas that at least includes COS, $H_2O$, $CO_2$, and $H_2S$. Examples of gas that includes such compounds include gases obtained by gasifying coal, oil, biomass, and the like. Gas to be purified by the present invention may include CO, $N_2$, HCl, $O_2$, and the like in addition to the compounds described above.

The gas purification apparatus of the present invention at least includes a COS treatment device and $H_2O$ adjustment means. The COS treatment device is a device that includes a COS conversion catalyst and configured to treat and degrade COS in the gas to be purified by hydrolysis. For the COS treatment device, a device in which a COS conversion catalyst has been loaded in an inside of a reactor, a device in which a combination of an $O_2$ removal catalyst and a COS conversion catalyst has been loaded in a reactor, and a COS conversion catalyst that also includes an $O_2$ removal function has been loaded in a reactor can be used. For the COS conversion catalyst, a catalyst that includes titania, chromium, and alumina can be generally used.

The $H_2O$ adjustment means of the gas purification apparatus according to the present invention is a means configured to adjust the concentration of $H_2O$ in the gas to be introduced into the COS treatment device. COS can be degraded at a high degradation rate by adjusting the concentration of $H_2O$ in gas to be purified before hydrolytic degradation of COS by using the COS conversion catalyst.

It is preferable that the $H_2O$ adjustment means of the gas purification apparatus according to the present invention be a means configured to adjust the $H_2O$ concentration so that a pressure equilibrium constant $K_P$ expressed by the following Expression (1) becomes $1 \leq K_P \leq 20$ where $P_{COS}$ is a partial pressure of COS in the gas, $P_{H2O}$ is a partial pressure of $H_2O$ in the gas, $P_{CO2}$ is a partial pressure of $CO_2$ in the gas, and $P_{H2S}$ is a partial pressure of $H_2S$ in the gas.

[Expression 2]

$$K_P = (P_{H2S} \times P_{CO2})/(P_{COS} \times P_{H2O}) \quad (1)$$

COS hydrolytic reactions are a reversible reaction, and if $K_P$ is 20 or smaller, hydrolysis of COS easily progresses, and thus, COS can be degraded at a high degradation rate. If $K_P$ is 10 or less, COS can be more quickly degraded. COS can be degraded in an excellent manner even when $K_P$ is as small as 1; however, a range of $K_P$ below 1 is disadvantageous to hydrolysis of COS in terms of equilibrium, and thus, it becomes difficult for hydrolysis of COS to progress in this range of $K_P$.

The pressure equilibrium constant can be theoretically varied by adjusting not only the partial pressure of $H_2O$ but also the partial pressures of COS, $CO_2$, and $H_2S$. However, the ratios of COS, $CO_2$, and $H_2S$ are fixed depending on the raw stock to be gasified and based on gasification conditions or the like. Therefore, in order to vary the ratio of these compounds, a method should be used in which COS, $CO_2$, or $H_2S$ is individually mixed with gasified gas, for example. However, because COS and $H_2S$ are compounds to be recovered, it is not preferable to increase the amount thereof. Furthermore, it is not efficient to mix $CO_2$ with the gas for adjustment of the pressure equilibrium constant only, considering the cost of purchase of $CO_2$, and because it becomes necessary to separately install additional facilities. Among COS, $H_2O$, $CO_2$, and $H_2S$, the amount of $H_2O$ can be easily adjusted by changing the conditions for drying raw stock such as coal or by mixing $H_2O$ with gasified gas, for example. Accordingly, in the present invention, adjustment of $H_2O$ is the most effective means for varying the pressure equilibrium constant.

The gas purification apparatus of the present invention can further include at least one water washing device and at least one waste water treatment device. The water washing device is a device for washing the gas discharged from the COS treatment device with water and is configured to remove impurities, such as water-soluble halogen compounds, ammonia, organic matters, and trace metals by washing with water. It is preferable that the gas purification apparatus include a plurality of water washing devices that are preferably arranged in series. It is difficult to completely remove impurities by using one water washing device only, and by providing the plurality of water washing devices for removal of impurities, the purity of the gas can be increased. If a plurality of water washing devices is included, devices of the same shape can be used for the water washing devices.

The waste water treatment device is a device configured to treat waste water drained from the water washing device so that the waste water including the impurities that have been removed from the gas by washing with water can be disposed of. More specifically, the impurities are treated by using a device configuration including an ammonia stripping column and a flocculating precipitation device. Waste water drained from one water washing device can be treated by one waste water treatment device. Furthermore, waste water drained from a plurality of water washing devices can be treated by one waste water treatment device. Furthermore, waste water drained by at least one or more water washing devices can be treated by a plurality of waste water treatment devices.

If the gas purification apparatus of the present invention includes the water washing device and the waste water treatment device, the $H_2O$ adjustment means can be means configured to mix water from the waste water treatment device with gas to be introduced into the COS treatment device. If a feed line for feeding water from the waste water treatment device is connected to an introduction line for introducing gas into the COS treatment device, and if a control means configured to control the amount of water to be fed in accordance with the composition of the gas is further provided, for example, then $H_2O$ can be adjusted by mixing the water from the waste water treatment device with the gas. By using the above-described means, water used in the gas purification process can be circulated and reused multiple times without introducing $H_2O$ from an outside of the gas purification apparatus, and thus, the facility configuration of the gas purification apparatus can be simplified.

If the gas purification apparatus of the present invention is provided with a plurality of waste water treatment devices, it is preferable that the water from the waste water treatment device that treats waste water including less impurities be mixed with the gas. Halogen compounds may be contained in the gas to be purified as impurities, and the halogen compounds may be one of the causes of shorter life of COS conversion catalysts. If halogen compounds contained in the waste water are further present in the gas in addition to the existing halogen compounds in the gas, the life of the COS conversion catalyst may be further shortened. By mixing water from the waste water treatment device that treats waste water including less impurities with the gas, effects on the COS conversion catalyst can be suppressed to the minimum.

In the gas purification apparatus of the present invention, the $H_2O$ adjustment means can be a means configured to mix steam with gas to be introduced into the COS treatment device. If a feed line for feeding steam from a steam feed means is connected to an introduction line for introducing gas to the COS treatment device, and if a control means configured to control the amount of water to be fed in accordance with the composition of the gas is further provided, for example, then $H_2O$ can be adjusted by mixing the steam with the gas. Examples of the steam feed means include steam bleeding from boilers or steam turbines. If the steam feed means is a means that constitutes the gas purification apparatus, the facility configuration of the gas purification apparatus can be simplified without introducing $H_2O$ from an outside of the gas purification apparatus. The means for mixing steam with the gas to be introduced into the COS treatment device can be used in combination with the above-described means for mixing water from the waste water treatment device with the gas to be introduced into the COS treatment device.

The gas purification apparatus of the present invention can be further provided with a coal drying device and a gasification furnace. The coal drying device is a device configured to dry coal by removing moisture content from the coal, and coal drying devices such as a high-temperature flue gas heating type device, a rotational dryer type device, a steam fluidized bed type device, and a mechanical pressing type device can be used as the coal drying device. If coal is used as the raw stock of the gas to be purified and if the coal includes excessive moisture content, the gasification efficiency may decrease. To prevent this, in gasification of coal, the coal drying device is used to maintain the moisture content in the coal at a predetermined amount so that the gasification efficiency will not decrease. In drying coal, heat from the flue gas generated in the gas purification processes can be used, and alternatively, the coal can be dried by using heat introduced into the coal drying device from outside of the gas purification apparatus.

The gasification furnace is a furnace configured to gasify the dried coal. The coal dried by the coal drying device and oxygen, air, and oxygen-enriched air as gasification agents are deposited into the gasification furnace, and gasified gas is extracted by pyrolysis.

If the gas purification apparatus of the present invention is provided with the coal drying device and the gasification furnace, the $H_2O$ adjustment means can be a means configured to adjust the moisture content in the coal by using the coal drying device. $H_2O$ can be adjusted by controlling the moisture content in the coal before being gasified by providing measurement means configured to measure the moisture content in gasified gas in the gasification furnace and by further providing adjustment means configured to adjust the amount of heat to be introduced into the coal drying device and drying time for drying coal in accordance with the moisture content. It is important to consider the gasification efficiency in controlling the moisture content in the coal. By using the above-described means, $H_2O$ can be adjusted by using an existing coal drying device and a gasification furnace without installing additional facilities to correspond to an nonstationary state in which the concentration of COS in the gasified gas has abruptly increased.

The means for adjusting the moisture content in coal by using the coal drying device can be used in combination with the above-described means for mixing steam with the gas to be introduced into the COS treatment device and the above-described means for mixing water from the waste water treatment device with the gas to be introduced into the COS treatment device.

In addition to the above-described devices, the gas purification apparatus of the present invention can further include devices such as a dust collecting device configured to remove dust from the gas, a heat exchanger configured to adjust the temperature of the gas, an $H_2S$ absorption column configured to recover $H_2S$ from the gas, and an absorbing solution regeneration column configured to regenerate the absorbing solution that has absorbed $H_2S$.

According to the gas purification apparatus of the present invention, the concentration of $H_2O$ in the gas can be adjusted prior to hydrolysis of COS. Because the gas is appropriately cooled by mixing the moisture content with the gas, the load on the heat exchanger for cooling the high-temperature gas discharged from the gasification furnace down to a temperature suitable for hydrolysis is reduced, and as a result, the heat exchanger can be reduced in size. The hydrolysis easily progresses because the concentration of $H_2O$ in the gas has been adjusted, and as a result, it is possible to reduce the amount of the COS conversion catalyst, and thus, the COS treatment device can be reduced in size. Furthermore, because the concentration of $H_2O$ in the gas can be adjusted after gasification, not only raw stock that have been conventionally used but also raw stock with high sulfur content and raw stock with a low moisture content can be used.

Next, a gas purification method of the present invention will be described below.

The gas purification method of the present invention is a method of purifying gas that at least includes COS, $H_2O$, $CO_2$, and $H_2S$, and the method at least includes an $H_2O$ adjustment step and a COS treatment step. The $H_2O$ adjustment step is a step of adjusting the concentration of $H_2O$ in the gas. The $H_2O$ adjustment step is a preparation step for previously adjusting the concentration of $H_2O$ in the gas to be purified, which is performed in order to degrade COS at a high degradation rate.

The COS treatment step is a step of treating and degrading COS in the gas in which the concentration of $H_2O$ has been adjusted in the $H_2O$ adjustment step by hydrolysis by using the COS conversion catalyst. COS hydrolytic reactions are a catalytic reaction, and it is necessary to adjust the reaction temperature according to temperature conditions that conform to conditions for using the catalyst. More specifically, it is preferable to adjust the temperature of the gas to a temperature in a range of 200° C. to 400° C., which is a temperature suitable for hydrolysis of COS, after adjusting the concentration of $H_2O$ in the gas or at the same time as adjusting the concentration of $H_2O$ in the gas.

It is preferable that the H$_2$O adjustment step in the gas purification method according to the present invention be a step of adjusting the H$_2$O concentration so that a pressure equilibrium constant K$_P$ expressed by the following expression (1) becomes 1≤K$_P$≤20 where P$_{COS}$ is a partial pressure of COS in the gas, P$_{H2O}$ is a partial pressure of H$_2$O in the gas, P$_{CO2}$ is a partial pressure of CO$_2$ in the gas, and P$_{H2S}$ is a partial pressure of H$_2$S in the gas. To vary the pressure equilibrium constant, adjustment of H$_2$O is the most effective means for varying the pressure equilibrium constant considering the ease of variation.

[Expression 3]

$$K_P = (P_{H2S} \times P_{CO2})/(P_{COS} \times P_{H2O}) \quad (1)$$

The gas purification method of the present invention can further include at least one water washing step and at least one waste water treatment step. The water washing step is a step of washing the gas of which COS has been treated and degraded with water, and in this step, impurities such as water-soluble halogen compounds, ammonia, organic matter, and trace metals are removed by washing with water. In the water washing step, the washing with water may be performed only once; however, in order to increase the purity of the gas to be purified, the washing with water may also be performed a plurality of times.

The waste water treatment step is a step for treating the waste water to be drained in the water washing step, and the treatment is performed in this step so that the waste water including the impurities that have been removed from the gas by washing with water can be disposed of. More specifically, impurities, such as halogen compounds, ammonia, organic matter, and trace metals are treated by ammonia stripping or flocculating precipitation. It is necessary to sufficiently treat ammonia, in particular, and a plurality of waste water treatment devices may be provided to perform an ammonia stripping treatment a plurality of times.

If the gas purification method of the present invention includes the water washing step and the waste water treatment step, then the H$_2$O adjustment step can be a step of mixing the water treated by the waste water treatment step with the gas before the COS treatment step.

In the gas purification method of the present invention, the H$_2$O adjustment step can be a step of mixing steam with the gas before the COS treatment step. The step of mixing steam with the gas before the COS treatment step can be used in combination with the above-described step of mixing the water treated by the waste water treatment step with the gas before the COS treatment step.

The gas purification method of the present invention can further include a coal drying step and a gasification step. The coal drying step is a step of drying coal by removing the moisture content from the coal. This step is carried out if coal is used as a raw stock of the gas to be purified so as to maintain the moisture content in the coal at a predetermined amount so that the gasification efficiency would not decrease.

The gasification step is a step of gasifying the dried coal. The gasification is performed by using oxygen, air, and oxygen-enriched air as gasification agents and thermally degrading the coal under an atmosphere of the gasification agent.

If the gas purification method of the present invention includes the coal drying step and the gasification step, the H$_2$O adjustment step can be a step of adjusting the moisture content in the coal by performing the coal drying step. If a measurement means configured to measure the moisture content in the gasified gas is provided at an outlet of the gasification furnace, and if an adjustment means configured to adjust the amount of heat to be introduced into the coal drying device and the drying time for the coal in accordance with the moisture content is further provided, for example, H$_2$O can be adjusted by controlling the moisture content in the coal before gasification.

The step of adjusting the moisture content in the coal in the coal drying step can be used in combination with the above-described step of mixing the steam with the gas before the COS treatment step and the above-described step of mixing the water treated by the waste water treatment step with the gas before the COS treatment step.

In addition to the above-described steps, the gas purification method of the present invention can include steps such as a dust collection step of removing dust from the gas, a temperature adjustment step of adjusting the temperature of the gas, an H$_2$S recovery step of recovering H$_2$S from the gas, and an absorbing solution regeneration step of regenerating the absorbing solution that has absorbed H$_2$S.

According to the gas purification method of the present invention, the heat exchanger configured to cool the gas down to a temperature suitable for hydrolysis can be reduced in size, the catalyst amount of the COS conversion catalyst can be reduced, and the COS treatment device can be reduced in size. In addition, because the concentration of H$_2$O in the gas can be adjusted after gasification, not only raw stock that has been conventionally used, but also raw stock having a high sulfur content and raw stock with a low moisture content can be used.

Embodiments of the gas purification apparatus and the gas purification method according to the present invention will be described below with reference to the drawings. Note here that the present invention is not limited to the embodiments illustrated in the drawings.

Figure 1:
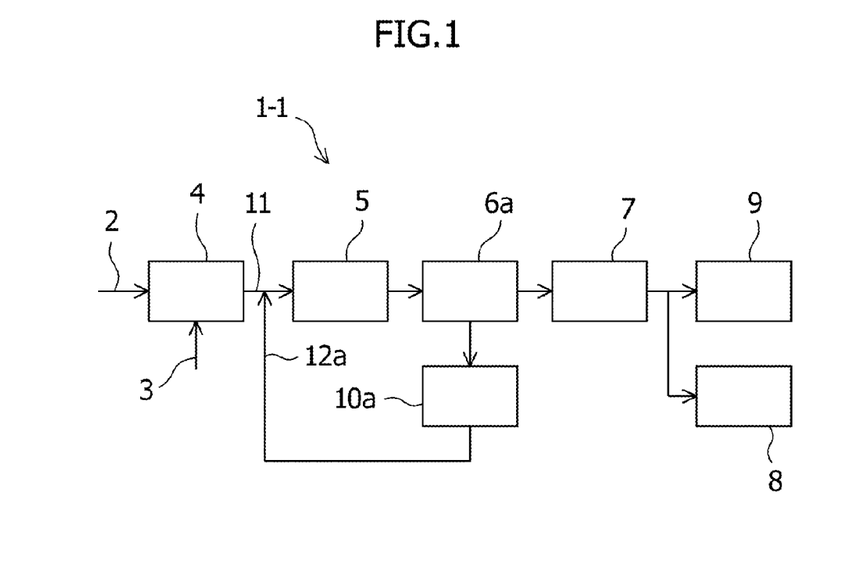
FIG. 1 is an outline view of a gas purification process.

FIG. 1 is an outline view of a gas purification process 1-1. In this process, first, coal 2 is gasified by a gasification furnace 4 in the presence of a gasification agent 3. The gas having been obtained by gasifying the coal at least includes COS, H$_2$O, CO$_2$, and H$_2$S, and impurities such as halogen compounds are also contained therein. The obtained gas is purified by converting COS in the obtained gas into H$_2$S by using a COS treatment device 5, removing impurities by using a water washing column 6a, and then recovering H$_2$S from the gas by using an H$_2$S absorption column 7. The purified gas is used for chemical product synthesis 8 for synthesizing chemical products such as methanol and ammonia or is introduced into gas turbines or steam turbines for electric power generation by using an electric power generation device 9. A waste water treatment device 10a is configured to treat waste water drained from the water washing column 6. Some of the treated waste water is fed from the waste water treatment device 10 via a feed line 12a into an introduction line 11 for introducing the gas from the gasification furnace 4 into the COS treatment device 5, and thereby, H$_2$O in the gas before being introduced into the COS treatment device 5 is adjusted.

Figure 2:
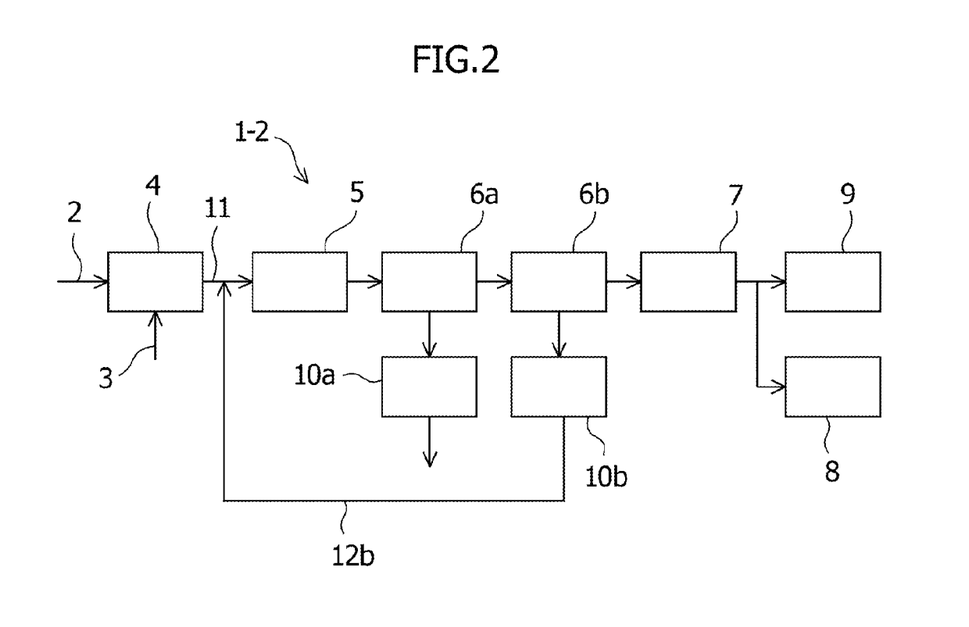
FIG. 2 is an outline view of a gas purification process that includes a water washing column and the like in addition to the gas purification process illustrated in FIG. 1.

FIG. 2 is an outline view of a gas purification process 1-2, which is a process that includes a water washing column 6b, a waste water treatment device 10b, and a feed line 12b in addition to the configuration of the gas purification process illustrated in FIG. 1. Considering influences on COS conversion catalysts imparted by halogen compounds in the waste water, the waste water from the waste water treatment device 10a is released. The waste water from the waste water treatment device 10b containing less impurities is introduced into the gas before being introduced into the COS treatment device 5.

Figure 3:
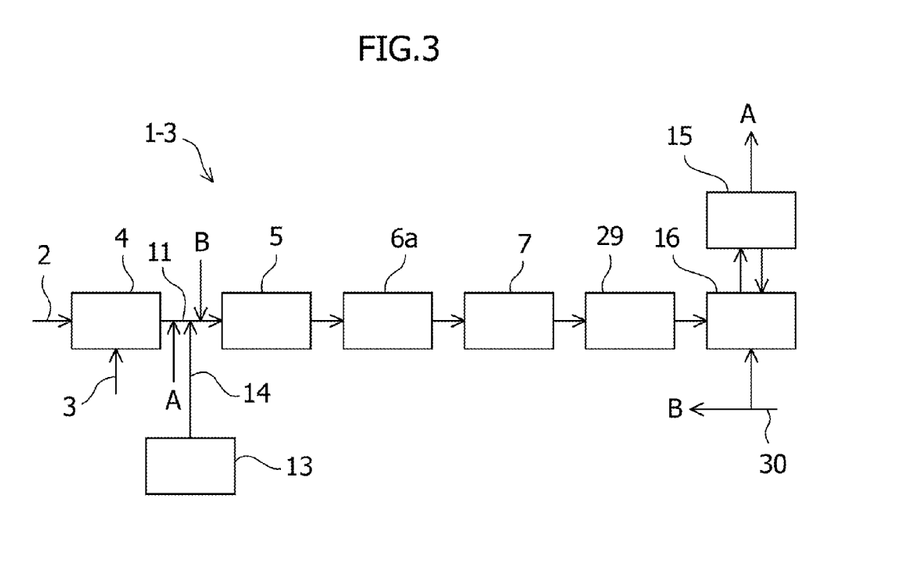
FIG. 3 is an outline view of a gas purification process of an embodiment different from those illustrated in FIGS. 1 and 2.

FIG. 3 is an outline view of a gas purification process 1-3, which is an embodiment different from those illustrated in FIGS. 1 and 2. In this process, $H_2O$ in the gas before being introduced into the COS treatment device 5 is adjusted by feeding steam from a boiler 13 into the introduction line 11 via a feed line 14. In addition, $H_2O$ in the gas can be adjusted by bleeding steam from a steam turbine 15 and feeding the gas via a route indicated by arrows A in the drawing or can be adjusted also by feeding a part of feed water 30 to be fed into a waste water recovery boiler 16 via a route indicated by arrows B in the drawing.

Figure 4:
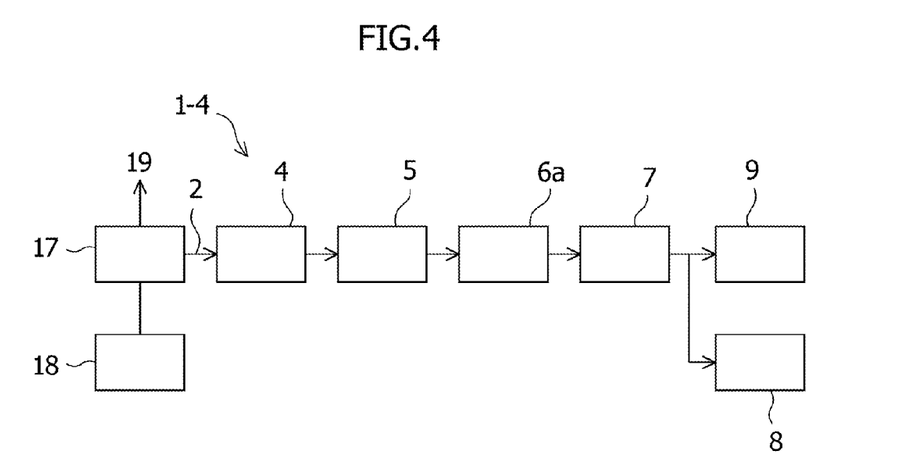
FIG. 4 is an outline view of a gas purification process of an embodiment different from those illustrated in FIGS. 1 to 3.

FIG. 4 is an outline view of a gas purification process 1-4, which is an embodiment different from those illustrated in FIGS. 1 to 3. Moisture is removed from the coal 2 by using a coal drying device 17 to dry the coal 2, and the dried coal 2 is then introduced into the gasification furnace 4. The drying of the coal is carried out by using heat from the flue gas introduced from flue gas 18 for drying. In this gas purification process 1-4, the temperature and the feeding amount of the flue gas, the drying time for the coal, and the like are controlled, and thus, some of the moisture content is discharged to an outside of the system and the coal 2 with the moisture content being maintained is introduced into the gasification furnace, and thereby $H_2O$ in the gas is adjusted.

Figure 5:
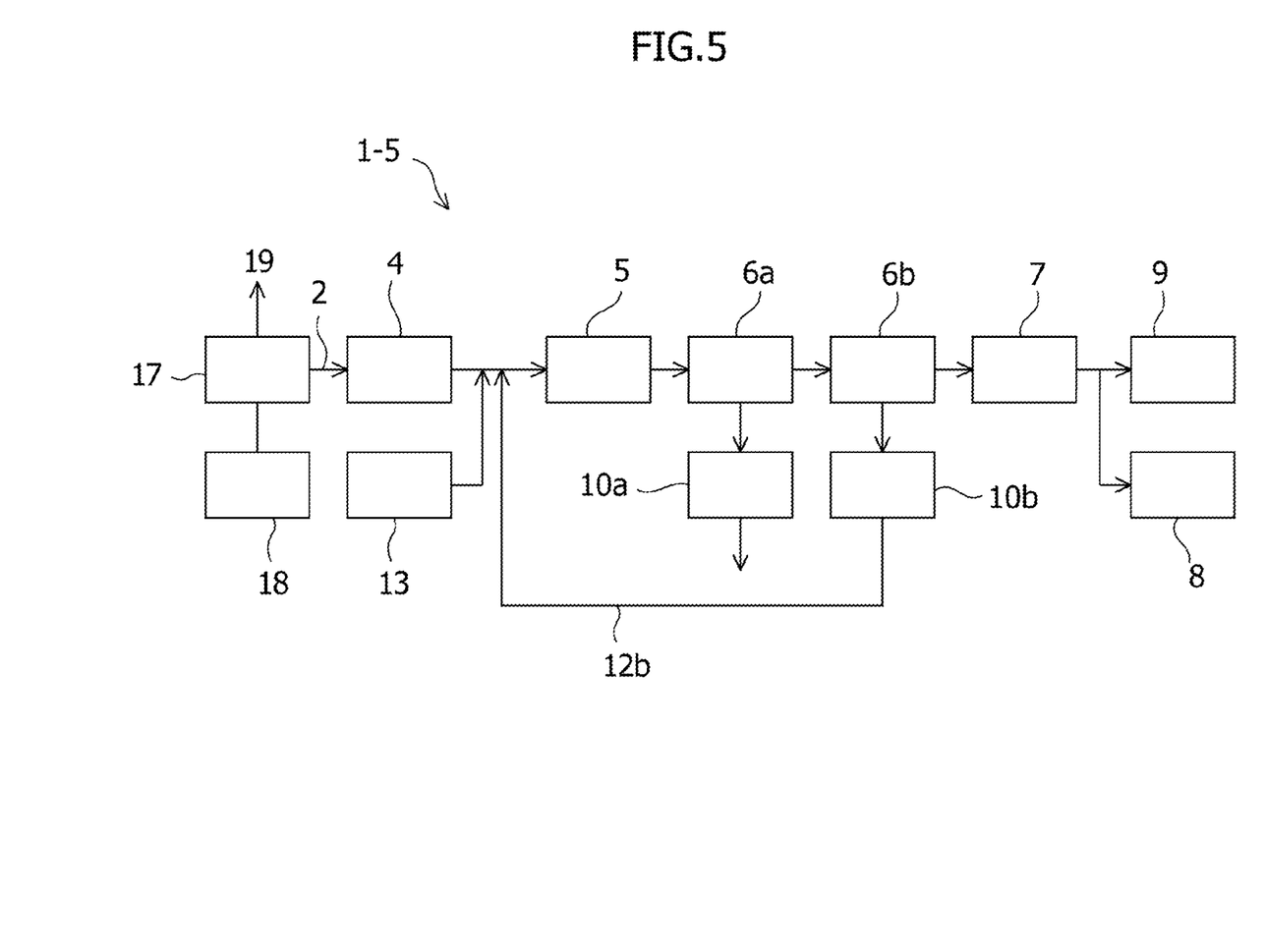
FIG. 5 is an outline view of a gas purification process of an embodiment that includes all the $H_2O$ adjustment means illustrated in FIGS. 1 to 4.

FIG. 5 is an outline view of the gas purification process 1-5, which is an embodiment provided with all the $H_2O$ adjustment means illustrated in FIGS. 1 to 4. The introduction of the waste water from the waste water treatment device, the introduction of steam from the boiler, and the introduction of the moisture content performed by controlling drying of the coal can be individually controlled so that $H_2O$ in the gas is appropriately adjusted in accordance with the state of the purification of the gas.

Figure 6:
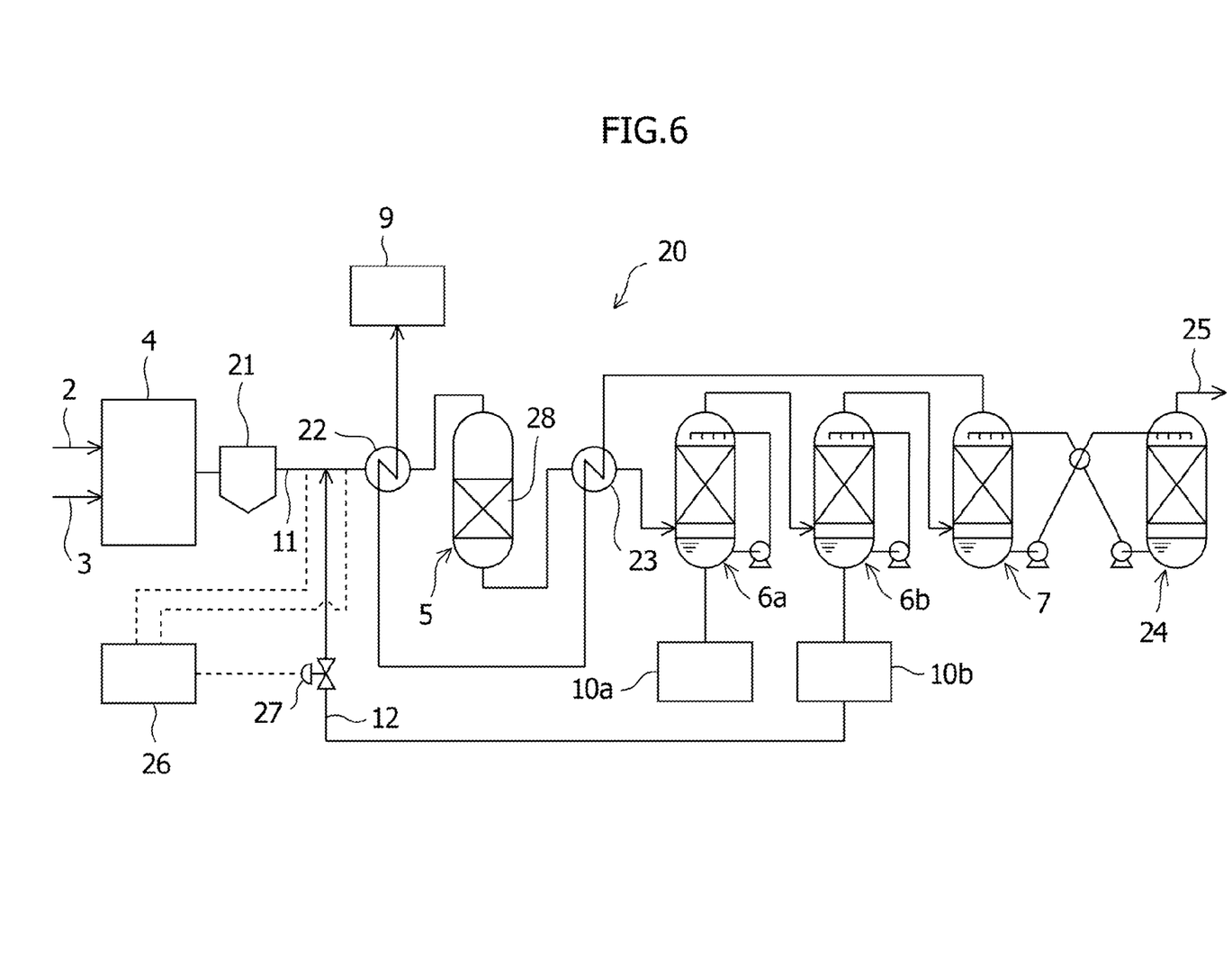
FIG. 6 is a diagram that illustrates an example of a gas purification apparatus of the present invention.

FIG. 6 is a diagram that illustrates an example of a gas purification apparatus 20 according to the present embodiment. The gas purification apparatus 20 is a gas purification apparatus corresponding to the outline view of the gas purification process 1-2 illustrated in FIG. 2. The gas purification apparatus 20 has a basic configuration including the gasification furnace 4, a dust collecting device 21, heat exchangers 22 and 23, the COS treatment device 5, the water washing columns 6a and 6b, the waste water treatment devices 10a and 10b, the $H_2S$ absorption column 7, and an absorbing solution regeneration column 24.

In this gas purification apparatus 18, first, the coal 2 is gasified by the gasification furnace 4 in the presence of the gasification agent 3. The gas obtained by gasification of the coal at least contains COS, $H_2O$, $CO_2$, and $H_2S$, and impurities such as halogen compounds and dust are also contained therein. Dust is removed from the obtained gas first by using the dust collecting device 21, and then, the gas is cooled by the heat exchanger 22 to a temperature in a range of 200° C. to 400° C., which is a temperature suitable for hydrolysis of COS. Next, COS in the gas is converted by the COS treatment device 5 into $H_2S$, heat is recovered by the heat exchanger 23, then impurities are removed therefrom by using the water washing columns 6a and 6b, and then $H_2S$ is recovered by the $H_2S$ absorption column 7 from the gas to purify the gas. The temperature of the gas is low after the purification, and the purified gas is introduced into the electric power generation device 9 via the heat exchangers 22 and 23 while being used for cooling of the gas discharged from a dust collecting device 19 or the COS treatment device 5, and heat is thus recovered from the purified gas. After having absorbed $H_2S$ in the $H_2S$ absorption column 7, the absorbing solution is regenerated by being separated from $H_2S$ 25, of which the concentration has become high in the absorbing solution regeneration column 24, and the regenerated solution is fed into the $H_2S$ absorption column 7. The waste water treatment device 10a, 10b treats the waste water drained from the water washing column 6a, 6b. Some of the treated waste water is fed from the waste water treatment device 10b via the feed line 12 into the introduction line 11 for introducing the gas from the dust collecting device 21 into the COS treatment device 5, and thereby, $H_2O$ in the gas before being introduced into the COS treatment device 5 is adjusted. The amount of the waste water to be fed is measured by moisture content measuring devices 26, which are provided at locations across a location of mixing the waste water from the feed line 12 and configured to measure the moisture content contained in the gas that passes through the introduction line 11, and the amount of the waste water is adjusted by opening and closing a control valve 27 in accordance with the moisture content. The measuring device 26 is capable of measuring the content of COS, $CO_2$, and $H_2S$ in addition to the moisture content in the gas. On the basis of measurement values obtained by the measuring devices 26, $H_2O$ can be adjusted so that the pressure equilibrium constant ($K_P$), which is calculated based on the partial pressure of COS in the gas ($P_{COS}$), the partial pressure of $H_2O$ ($P_{H2O}$), the partial pressure of $CO_2$ ($P_{CO2}$), and the partial pressure of $H_2S$ ($P_{H2S}$), becomes $1 \leq K_P \leq 20$. The waste water can be vaporized by the heat from the gas. Alternatively, the waste water can be vaporized prior to mixing of the waste water with the gas.

In the gas purification apparatus according to the present embodiment, for the gasification furnace, a fixed type gasification furnace, a flow type gasification furnace, a jet stream type gasification furnace, and the like can be used. For the dust collecting device, a cyclone type dust collecting device, a filtering type dust collecting device, and the like can be used. For the heat exchangers, a shell and tube type heat exchanger and the like can be used.

In the gas purification apparatus according to the present embodiment, for the COS treatment device, a device in which a COS conversion catalyst is loaded in an inside of the reactor can be used, for example. For the COS conversion catalyst, a honeycomb-shaped catalyst can be used, and catalysts with a pellet-like shape can also be used, and COS is converted into $H_2S$ when the gas passes through the catalyst.

Next, for the water washing column, a water washing column can be used which includes a configuration in which washing water is fed from an upper portion in the water washing column and washing water that has accumulated in a lower portion is circulated by using a circulation pump to be fed therefrom, for example.

For the waste water treatment device, a waste water treatment device can be used which includes a configuration including an ammonia stripping column and a flocculating precipitation device. The ammonia stripping column is a device configured to remove ammonia with a high concentration contained in the waste water by dispersing it in the gas phase by blowing steam or air therein. The ammonia stripping column is constituted by a perforated plate and a downcomer provided in its inside, for example, and the waste water flows down from an upper stage to a lower stage via the downcomer. In contrast, the steam flows up from the lower stage to the upper stage through the holes of the perforated plate and rises in the liquid that has been dammed on the perforated plate. The waste water and the steam are thus brought into contact with each other and the ammonia dissolved in the waste water is transferred to the steam. The dissipated ammonia is degraded by oxidation through a catalytic reaction column in which a catalyst has been loaded, for example, and the degraded substance is then released into the atmosphere as harmless nitrogen gas. On the other hand, the flocculating precipitation device is constituted by a flocculation tank and a precipitation tank, for example. In the flocculation tank, the waste water and a flocculant such as aluminum sulfate and polyaluminum chloride are mixed together, and thus, impurities are coagulated and flocculated. In the precipitation tank, the flocculated substances are allowed to precipitate to separate the precipitate into precipitated and flocculated substances and treat water. The waste water is treated by using the ammonia stripping column and the flocculating precipitation device.

The $H_2S$ absorption column can be provided with a configuration in which an amine compound absorption solution, which is constituted by an aqueous solution of an amine compound, is fed from an upper portion in an inside of the $H_2S$ absorption column and also the absorbing solution that has accumulated in a lower portion of the column is circulated by using a circulation pump to be fed therefrom.

The absorbing solution regeneration column can be provided with a configuration in which the absorbing solution that has absorbed $H_2S$ is heated by a reboiler, then the solution is cooled by a cooler before being separated into $H_2S$ and an amine compound absorbing solution, and then the amine compound absorbing solution is fed into the $H_2S$ absorption column by using a pump.

In the gas purification apparatus 18 illustrated in FIG. 6, the gas is appropriately cooled by mixing the moisture content with the gas before performing hydrolysis of COS. Thus, the load on the heat exchanger 20 for cooling the high-temperature gas discharged from the gasification furnace is reduced, and as a result, the heat exchanger 20 can be reduced in size. It becomes easy for the hydrolysis to progress because the concentration of $H_2O$ in the gas has been adjusted, and as a result of this, it is enabled to reduce the catalyst amount of the COS conversion catalyst 26, and thus, the COS treatment device 5 can be reduced in size. Furthermore, because the concentration of $H_2O$ in the gas can be adjusted after the gasification, not only coal 2 that has been conventionally used, but also coal with high sulfur content and coal having a low moisture content can be used.

INDUSTRIAL APPLICABILITY

According to the gas purification apparatus and the gas purification method of the present invention, the treatment for degrading COS can be promoted by adjusting the concentration of $H_2S$ of the material gas without decreasing the thermal efficiency, and accordingly, the present invention is industrially useful.

REFERENCE SYMBOLS LIST 1-1 Gas purification process
1-2 Gas purification process
1-3 Gas purification process
1-4 Gas purification process
1-5 Gas purification process
2 Coal
3 Gasification agent
4 Gasification furnace
5 COS treatment device
6a, 6b Water washing column
7 $H_2S$ absorption column
8 Synthesis of chemical product
9 Electric power generation device
10a, 10b Waste water treatment device
11 Introduction line
12a, 12b Feed line
13 Boiler
14 Feed line
15 Steam turbine
16 Waste water recovery boiler
17 Coal drying device
18 Flue gas for drying
19 Steam
20 Gas purification apparatus
21 Dust collecting device
22 Heat exchanger
23 Heat exchanger
24 Absorbing solution regeneration column
25 High-concentration $H_2S$
26 Measuring device
27 Control valve
28 COS conversion catalyst
29 Gas turbine
30 Feed water

The invention claimed is:

1. A gas purification apparatus configured to purify gas including COS, $H_2O$, CO2, and $H_2S$, the apparatus comprising:
   a COS treatment device comprising a COS conversion catalyst and configured to degrade COS in the gas by hydrolyzing;
   $H_2O$ adjustment means configured to adjust a concentration of $H_2O$ in the gas to be introduced into the COS treatment device;
   a coal drying device configured to dry coal by removing moisture from the coal;
   a gasification furnace configured to gasify the dried coal;
   at least two water washing devices in the flowing direction of the gas configured to treat the gas discharged from the COS treatment device with water; and
   at least two waste water treatment devices, each disposed with one of the at least two water washing devices, the at least two waste water treatment devices configured to treat waste water drained from the at least two water washing devices;
   wherein the $H_2O$ adjustment means is configured to mix water from one of the at least two waste water treatment devices which is disposed downstream from another of the at least two waste water treatment devices in view of the gas flow, with the gas to be introduced into the COS treatment device.

2. The gas purification apparatus according to claim 1, wherein the $H_2O$ adjustment means is means configured to adjust the concentration of $H_2O$ so that a pressure equilibrium constant $K_P$ expressed by the following expression (1) becomes $1 \leq K_P \leq 20$:

[Expression 1]

$$K_P = (P_{H2S} \times P_{CO2})/(P_{COS} \times P_{H2O}) \qquad (1)$$

where $P_{COS}$ is a partial pressure of COS in the gas, $P_{H2O}$ is a partial pressure of $H_2O$ in the gas, $P_{CO2}$ is a partial pressure of $CO_2$ in the gas, and $P_{H2S}$ is a partial pressure of $H_2S$ in the gas.

3. The gas purification apparatus according to claim 1, wherein the H₂O adjustment means is further configured to mix steam with the gas to be introduced into the COS treatment device.

4. A gas purification method for purifying gas including COS, H₂O, CO₂, and H₂S, the method comprising:
- an H₂O adjustment step of adjusting a concentration of H₂O in the gas;
- a COS treatment step of degrading COS in the gas of which the concentration of H₂O has been adjusted by hydrolyzing by using a COS conversion catalyst;
- a coal drying step of drying coal by removing moisture from the coal;
- a gasification step of gasifying the dried coal;
- at least two water washing steps of water washing the gas obtained by degrading COS; and
- at least two waste water treatment steps of treating waste water, each waste water treatment step treating waste water discharged from one of the at least two water washing steps;
- wherein the H₂O adjustment step is a step of mixing the water treated in one of the at least two waste water treatment steps which is after another of the at least two waste water treatment steps, with the gas before the COS treatment step.

5. The gas purification method according to claim 4, wherein the H₂O adjustment step is a step of adjusting the concentration of H₂O so that a pressure equilibrium constant $K_P$ expressed by the following expression (1) becomes $1 \leq K_P \leq 20$:

[Expression 2]

$$K_P = (P_{H2S} \times P_{CO2})/(P_{COS} \times P_{H2O}) \tag{1}$$

where $P_{COS}$ is a partial pressure of COS in the gas, $P_{H2O}$ is a partial pressure of H₂O in the gas, $P_{CO2}$ is a partial pressure of CO₂ in the gas, and $P_{H2S}$ is a partial pressure of H₂S in the gas.

6. The gas purification method according to claim 4, wherein the H₂O adjustment step is a step of further including mixing steam with the gas before the COS treatment step.

7. The gas purification apparatus according to claim 2, wherein the H₂O adjustment means is further configured to mix steam with the gas to be introduced into the COS treatment device.

8. The gas purification method according to claim 5, wherein the H₂O adjustment step is a step of further including mixing steam with the gas before the COS treatment step.

* * * * *